(12) United States Patent
Suzuki et al.

(10) Patent No.: US 9,870,185 B2
(45) Date of Patent: Jan. 16, 2018

(54) PRINT MANAGER SERVER, PRINT MANAGEMENT METHOD, AND STORAGE MEDIUM FOR PREDICTIVE PRINT PREVIEW OF PRINT JOBS

(71) Applicants: Hiroshi Suzuki, Tokyo (JP); Toshiyuki Haginoya, Tokyo (JP)

(72) Inventors: Hiroshi Suzuki, Tokyo (JP); Toshiyuki Haginoya, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/237,560

(22) Filed: Aug. 15, 2016

(65) Prior Publication Data
US 2017/0060491 A1 Mar. 2, 2017

(30) Foreign Application Priority Data
Aug. 24, 2015 (JP) .................................. 2015-164815

(51) Int. Cl.
*G06F 3/12* (2006.01)

(52) U.S. Cl.
CPC .......... *G06F 3/1288* (2013.01); *G06F 3/1211* (2013.01); *G06F 3/1256* (2013.01); *G06F 3/1286* (2013.01); *G06F 3/1219* (2013.01)

(58) Field of Classification Search
None
See application file for complete search history.

(56) References Cited

U.S. PATENT DOCUMENTS
8,994,975 B2    3/2015  Ono

FOREIGN PATENT DOCUMENTS
JP    2014-059696    4/2014

*Primary Examiner* — Barbara Reinier
(74) *Attorney, Agent, or Firm* — Duft Bornsen & Fettig LLP

(57) ABSTRACT

A disclosed print manager server includes one or more processors and a memory configured to store a print management program. The processors execute the print management program to perform a process including analyzing an attribute of print data introduced, predicting a page of a preview image to be generated based on the analyzed attribute, a preview history of previous print jobs, and a preview prediction condition, generating the preview image of the predicted page, and providing the generated preview image in response to a request to display a preview.

9 Claims, 17 Drawing Sheets

FIG.3A

| ID | JOB NAME | COMPUTER NAME | USER NAME | PRINTER NAME | CLASS | NUMBER OF PAGES | PRINT JOB FILE PATH | ... |
|---|---|---|---|---|---|---|---|---|
| 001 | ABCD | COM1 | USER1 | AP | C1 | 1000 | C:¥···¥ABCD_001.dat | ... |
| 002 | EFGH | COM2 | USER2 | BP | C2 | 2000 | C:¥···¥EFGH_002.dat | ... |
| 003 | ABCJ | COM1 | USER1 | AP | C3 | 1500 | C:¥···¥ABCJ_003.dat | ... |
| .. | .. | .. | .. | .. | .. | .. | .. | .. |

```
[SECTION]
KEY=VALUE
```

```
[Common]
PreviewPredictionNum=3
ConversionPages=3
[PreviewPrediction1]
PredictionKey=JOB NAME
Direction=FORWARD MATCH
ComparisonNum=5
[PreviewPrediction2]
PredictionKey=USER NAME
Direction=COMPLETE MATCH
[PreviewPrediction3]
PredictionKey=NUMBER OF PAGES
Range=10%
```

FIG.3D

| JOB NAME | COMPUTER NAME | USER NAME | PRINTER NAME | CLASS | NUMBER OF PAGES | PREVIEW PAGE |
|---|---|---|---|---|---|---|
| ABCD | COM1 | USER1 | AP | C1 | 1000 | 1, 30, 1000 |
| EFGH | COM2 | USER2 | BP | C2 | 2000 | 1000, 2000 |
| ABCJ | COM1 | USER1 | AP | C3 | 1500 | 1, 100, 200, 1000 |
| .. | .. | .. | .. | .. | .. | .. |

PREVIEW PREDICTION CONDITIONS

CONDITION #1: FIRST THREE CHARACTERS OF JOB NAME ARE MATCHED
CONDITION #2: COMPUTER NAME IS COMPLETELY MATCHED
CONDITION #3: NUMBER OF PAGES IS WITHIN A RANGE OF 5%
EXTRACT TOP THREE PAGES THAT SATISFY THE CONDITIONS MOST

FIG.10B

ATTRIBUTE OF INPUT PRINT DATA

JOB NAME : AAA010
COMPUTER NAME : PC001
NUMBER OF PAGES : 100 PAGES

FIG.10C

FIRST THREE CHARACTERS OF THE JOB NAME ARE AAA

FIG.11A

| JOB NAME | COMPUTER NAME | USER NAME | PRINTER NAME | CLASS | NUMBER OF PAGES | PREVIEW PAGE |
|---|---|---|---|---|---|---|
| AAA001 | PC001 | USER001 | PRINTER001 | CLASS001 | 100 | 1, 50, 51, 80, 100 |
| BBB002 | PC001 | USER001 | PRINTER006 | CLASS001 | 105 | 1, 105 |
| BBB003 | PC001 | USER001 | PRINTER006 | CLASS001 | 1000 | 1000 |
| BBB004 | PC002 | USER001 | PRINTER007 | CLASS001 | 1000 | 1000 |
| AAA002 | PC001 | USER001 | PRINTER001 | CLASS001 | 200 | 1, 100, 200 |
| AAA003 | PC001 | USER002 | PRINTER002 | CLASS001 | 100 | 50, 100 |
| AAA004 | PC002 | USER002 | PRINTER002 | CLASS001 | 100 | 1, 100 |
| AAA005 | PC002 | USER002 | PRINTER003 | CLASS001 | 300 | 1, 300 |
| AAA006 | PC002 | USER002 | PRINTER003 | CLASS001 | 400 | 1, 100 |
| CCC001 | PC004 | USER002 | PRINTER008 | CLASS001 | 10000 | 1000, 2000, 3000, 4000, 10000 |
| CCC002 | PC004 | USER003 | PRINTER008 | CLASS002 | 100 | 50, 100 |
| AAA007 | PC001 | USER003 | PRINTER004 | CLASS002 | 105 | 50, 100 |
| AAA008 | PC001 | USER003 | PRINTER004 | CLASS002 | 95 | 50 |
| AAA009 | PC001 | USER003 | PRINTER005 | CLASS002 | 100 | 1, 50, 100 |
| AAA010 | PC001 | USER003 | PRINTER005 | CLASS002 | 100 | 30, 50, 100 |
| CCC003 | PC004 | USER004 | PRINTER008 | CLASS002 | 10000 | 1, 10000 |
| CCC004 | PC004 | USER004 | PRINTER008 | CLASS002 | 10050 | 1, 10000 |
| CCC005 | PC004 | USER004 | PRINTER009 | CLASS002 | 10050 | 1, 10000 |
| CCC006 | PC004 | USER004 | PRINTER010 | CLASS002 | 10000 | 1, 10000 |
| CCC007 | PC004 | USER004 | PRINTER010 | CLASS002 | 10000 | 1, 10000 |

FIG.11B

| JOB NAME | COMPUTER NAME | USER NAME | PRINTER NAME | CLASS | NUMBER OF PAGES | PREVIEW PAGE |
|---|---|---|---|---|---|---|
| AAA001 | PC001 | USER001 | PRINTER001 | CLASS001 | 100 | 1, 50, 51, 80, 100 |
| AAA002 | PC001 | USER001 | PRINTER001 | CLASS001 | 200 | 1, 100, 200 |
| AAA003 | PC001 | USER002 | PRINTER002 | CLASS001 | 100 | 50, 100 |
| AAA004 | PC002 | USER002 | PRINTER002 | CLASS001 | 100 | 1, 100 |
| AAA005 | PC002 | USER002 | PRINTER003 | CLASS001 | 300 | 1, 300 |
| AAA006 | PC002 | USER002 | PRINTER003 | CLASS001 | 400 | 1, 100 |
| AAA007 | PC001 | USER003 | PRINTER004 | CLASS002 | 105 | 50, 100 |
| AAA008 | PC001 | USER003 | PRINTER004 | CLASS002 | 95 | 50 |
| AAA009 | PC001 | USER003 | PRINTER005 | CLASS002 | 100 | 1, 50, 100 |
| AAA010 | PC001 | USER003 | PRINTER005 | CLASS002 | 100 | 30, 50, 100 |

FIG.12A

| COMPUTER NAME IS PC001 |
|---|

FIG.12B

| JOB NAME | COMPUTER NAME | USER NAME | PRINTER NAME | CLASS | NUMBER OF PAGES | PREVIEW PAGE |
|---|---|---|---|---|---|---|
| AAA001 | PC001 | USER001 | PRINTER001 | CLASS001 | 100 | 1, 50, 51, 80, 100 |
| AAA002 | PC001 | USER001 | PRINTER001 | CLASS001 | 200 | 1, 100, 200 |
| AAA003 | PC001 | USER002 | PRINTER002 | CLASS001 | 100 | 50, 100 |
| AAA007 | PC001 | USER003 | PRINTER004 | CLASS002 | 105 | 50, 100 |
| AAA008 | PC001 | USER003 | PRINTER004 | CLASS002 | 95 | 50 |
| AAA009 | PC001 | USER003 | PRINTER005 | CLASS002 | 100 | 1, 50, 100 |
| AAA010 | PC001 | USER003 | PRINTER005 | CLASS002 | 100 | 30, 50, 100 |

FIG.13A

NUMBER OF PAGES IS BETWEEN 95 TO 105

FIG.13B

| JOB NAME | COMPUTER NAME | USER NAME | PRINTER NAME | CLASS | NUMBER OF PAGES | PREVIEW PAGE |
|---|---|---|---|---|---|---|
| AAA001 | PC001 | USER001 | PRINTER001 | CLASS001 | 100 | 1, 50, 51, 80, 100 |
| AAA003 | PC001 | USER002 | PRINTER002 | CLASS001 | 100 | 50, 100 |
| AAA007 | PC001 | USER003 | PRINTER004 | CLASS002 | 105 | 50, 100 |
| AAA008 | PC001 | USER003 | PRINTER004 | CLASS002 | 95 | 50 |
| AAA009 | PC001 | USER003 | PRINTER005 | CLASS002 | 100 | 1, 50, 100 |
| AAA010 | PC001 | USER003 | PRINTER005 | CLASS002 | 100 | 30, 50, 100 |

FIG.14A

| 50TH PAGE: REFERRED TO SIX TIME |
| 100TH PAGE: REFERRED TO FIVE TIMES |
| 1ST PAGE: REFERRED TO TWICE |
| 30TH PAGE: REFERRED TO ONCE |
| 51ST PAGE: REFERRED TO ONCE |
| 80TH PAGE: REFERRED TO ONCE |

FIG.14B

THREE PAGES OF 1ST PAGE, 50TH PAGE, AND 100TH PAGE ARE SPECIFIED BASED ON SPECIFICATION OF PREVIEW PREDICTION CONDITION OF "EXTRACTING TOP THREE PAGES THAT SATISFY THE CONDITION".

PRINT MANAGER SERVER, PRINT MANAGEMENT METHOD, AND STORAGE MEDIUM FOR PREDICTIVE PRINT PREVIEW OF PRINT JOBS

CROSS-REFERENCE TO RELATED APPLICATIONS

The present application claims the benefit of priority under 35 U.S.C. §119 of Japanese Patent Application No. 2015-164815, filed on Aug. 24, 2015, the contents of which are incorporated herein by reference in their entirety.

BACKGROUND OF THE INVENTION

1. Field of the Invention

The disclosures discussed herein relate to a print manager server, a print management method, and a non-transitory storage medium storing a print management program.

2. Description of the Related Art

Recent requirements in printing technology and print management technology may involve printing less or even no printing with document management. More specifically, users increasingly desire to check printout results without printing in a manner closer to reality; that is, the users desire to see how the data the users desired to present will actually appear when printed on paper, before printing.

There are a number of software applications for displaying preview images of print data via graphical user interface (GUI) of the print management system in order to check print results without actually printing desired data on paper.

Print data are generally optimized for printing and not designed to be converted into preview images (images used for preview). Hence, it may take more time to display a complete preview image when a preview image is generated every time a user gives a preview instruction.

To reduce the time to display a complete preview image, Japanese Unexamined Patent Application Publication No. 2014-059696 (hereinafter referred to as "Patent Document 1"), for example, discloses a technology to generate preview images of all the pages from the print data in advance.

PATENT DOCUMENT

Patent Document 1: Japanese Unexamined Patent Application Publication No. 2014-059696

SUMMARY OF THE INVENTION

An aspect of the present invention is directed to providing a technology capable of reducing a time from requesting a preview to displaying a preview image.

According to an embodiment, a print manager server includes one or more processors and a memory configured to store a print management program. The processors execute the print management program to perform a process including: analyzing an attribute of print data introduced; predicting a page of a preview image to be generated based on the analyzed attribute, a preview history of previous print jobs, and a preview prediction condition; generating the preview image of the predicted page; and providing the generated preview image in response to a request to display a preview.

Other objects, features and advantages of the present invention will become more apparent from the following detailed description when read in conjunction with the accompanying drawings.

BRIEF DESCRIPTION OF THE DRAWINGS

FIG. 3A to FIG. 3D are diagrams illustrating various types of data structures and data formats according to an embodiment, where FIG. 3A depicts a data structure of print job analysis data, FIG. 3B depicts a data format of preview prediction settings, FIG. 3C depicts another data format of preview prediction settings, and FIG. 3D depicts a data structure of preview history data;

FIGS. 10A to 10C are diagrams illustrating examples of data referred to or generated in preview prediction, where FIG. 10A depicts preview prediction setting data, FIG. 10B depicts print job analysis data, and FIG. 10C depicts data of a condition #1;

FIGS. 11A and 11B are diagrams illustrating examples of data referred to or generated in preview prediction, where FIG. 11A depicts preview history data and FIG. 11B depicts preview history data extracted based on the condition #1;

FIGS. 12A and 12B are diagrams illustrating examples of data referred to or generated in preview prediction, where FIG. 12A depicts data of a condition #2 and FIG. 12B depicts preview history data extracted based on the condition #2;

FIGS. 13A and 13B are diagrams illustrating examples of data referred to or generated in preview prediction, where FIG. 13A depicts data of a condition #3 and FIG. 13B depicts preview history data extracted based on the condition #3; and FIGS. 14A and 14B are diagrams illustrating examples of data referred to or generated in preview prediction, where FIG. 14A depicts data of sorted results and FIG. 14B depicts predicted pages.

DETAILED DESCRIPTION OF THE PREFERRED EMBODIMENTS

The following illustrates preferred embodiments with reference the accompanying drawings.

Configuration

Figure 1:
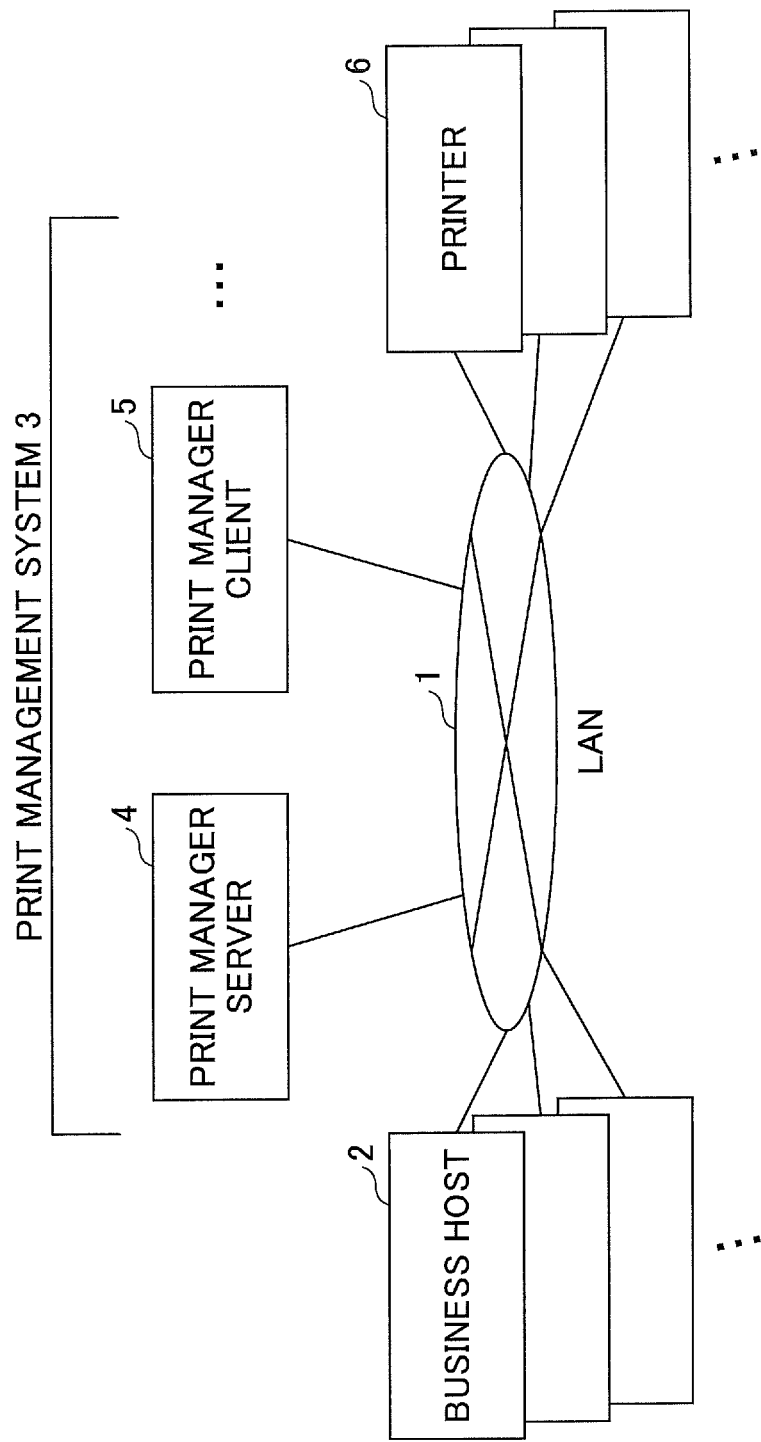
FIG. 1 is a diagram illustrating a configuration example of a system according to an embodiment.

FIG. 1 is a diagram illustrating a configuration example of a system according to an embodiment. As illustrated in FIG. 1, a print manager server 4 and two or more print manager clients 5 forming a print management system 3, two or more business hosts 2, and two or more printers 6 are coupled to the network 1.

The business host 2 has a function to output print data (a print data output part) and has business application software (business applications) running on the business host 2. The print manager server 4 has a function to generate a preview image of print data output by the business host 2 and provide the preview image to the print manager client 5 before causing the printer 6 to execute printing. The print manager client 5 has a display device as a communication tool with a user and a function to display a preview image (a preview display part). The printer 6 has a function to execute printing (i.e., transferring the print data to paper) based on the print data output by the business host 2.

Note that FIG. 1 illustrates an example of a print system applied to enterprise systems or mission-critical systems; however, the print system of the embodiment may be applied to systems in general offices where the print system is used by individual users. In this case, terminal apparatuses such as personal computers (PCs) used by users will serve both as the business host 2 to output print data and the print manager client 5 to monitor preview images.

Figure 2:
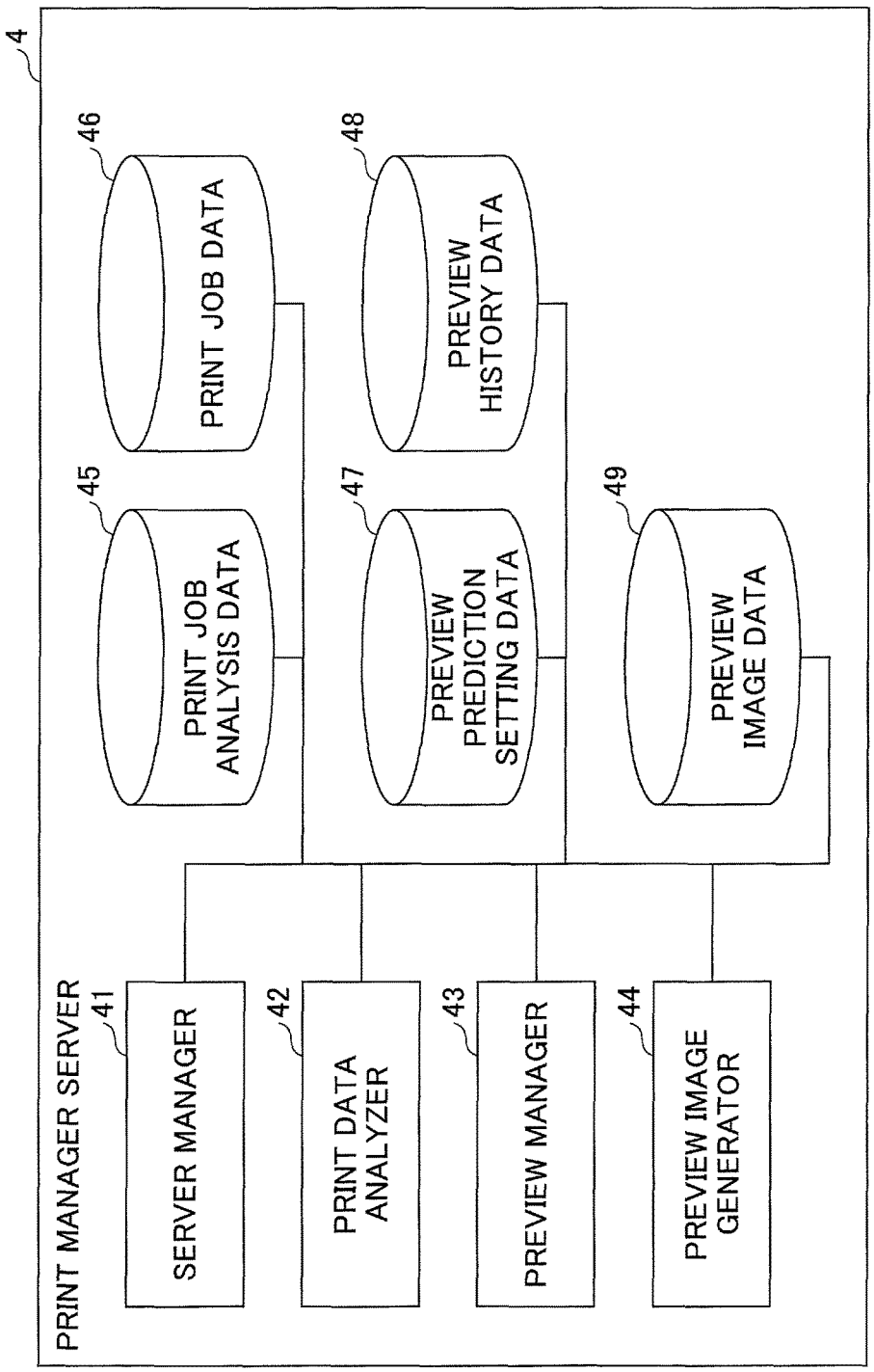
FIG. 2 is a diagram illustrating a software configuration example of a print manager server according to an embodiment.

FIG. 2 is a diagram illustrating a software configuration example of the print manager server 4. As illustrated in FIG. 2, the print manager server 4 includes a server manager 41, a print data analyzer 42, a preview manager 43, and a preview image generator 44.

The server manager 41 is configured to manage overall operations of the print manager server 4. The print data analyzer 42 is configured to analyze print data output from the business host 2. The preview manager 43 is configured to predict pages to generate preview images of the print data and instruct the preview image generator 44 to generate the preview images of the predicted pages. The preview image generator 44 is configured to generate the preview images.

The print manager server 4 further includes print job analysis data 45, print job data 46, preview prediction setting data 47, preview history data 48, and preview image data 49, as data to be generated, to be referred to, or to be updated in executing processes.

The print job analysis data 45 include print job data and attributes accompanying the print jobs. The print job analysis data 45 are obtained by the print data analyzer 42 as a result of analyzing the print data output from the business host 2. The details of the print job analysis data 45 will be described later. The print job data 46 are print data themselves that are stored in file formats. The preview prediction setting data 47 are preset data specifying conditions or the like for predicting pages to generate preview images. The details of the print job data 46 will be described later. The preview history data 48 are history data of previously displayed previews. The details of the preview history data 48 will be described later. The preview image data 49 are generated preview images of image files stored in formats capable of being displayed on the print manager client 5 such as JPEG files.

FIGS. 3A to 3D are diagrams illustrating examples of various types of data structures. FIG. 3A illustrates an example of print job analysis data 45 having items of an "ID", a "job name", a "computer name", a "user name", a "printer name", a "class", the "number of pages", and a "print job file path". The "ID" is an identifier for identifying a print job. The "job name" is a name given to the print job. The "computer name" is a name of an apparatus (e.g., a business host 2 and a print manager client 5) to which a print job is introduced. The "user name" is a name of a user who has introduced the print job. The "printer name" is a name of a printer (a printer 6) specified to execute printing of the print job. The "class" is a category of the print job. The "number of pages" is the number of print job pages. The "print job file path" is a location in which the print job is stored in a file format.

FIG. 3B depicts a data format of the preview prediction setting data 47 having at least one unit of a "[SECTION]" indicating a section and one or more sets of "KEY=VALUE" indicating a key and a corresponding value.

FIG. 3C depicts a specific example of the preview prediction setting data 47. In FIG. 3C, the "[Common]" indicates a common section, the "PreviewPredictionNum=3" indicates that the number of prediction conditions (key) is "3" (value), and the "ConversionPages=3" indicates that the total number of preview image pages (key) is "3" (value).

The "[PreviewPrediction1]" indicates a first condition section. The "PredictonKey=job name" indicates that a prediction key (key) used to search for the prediction condition is a "job name" (value), the "Direction=forward matching" indicates that a direction (key) to conduct the search is "forward matching" (value) search, and the "ComparisonNum=5" indicates that the number of comparing characters (key) used for the search is "5" (value).

The "[PreviewPrediction2]" indicates a second condition section. The "PredictonKey=user name" indicates that a prediction key (key) used to search for the prediction condition is a "user name" (value) and the "Direction=complete matching" indicates that a direction (key) to conduct the search is "complete matching" (value) search.

The "[PreviewPrediction3]" indicates a third condition section. The "PredictonKey=number of pages" indicates that a prediction key (key) used to search for the prediction condition is the "number of pages" (value) and the "Range=10%" indicates that the acceptable range (key) used to determine the match is "10%" (value).

The preview prediction setting data 47 may be edited by users; allowing the users to set prediction conditions adapted for individual operations may increase predictive probabilities while reducing generation of unnecessary pages of preview images.

FIG. 3D illustrates an example of preview history data 48 having items of a "job name", a "computer name", a "user name", a "printer name", a "class", the "number of pages", and a "preview page". The preview history data 48 may have items similar to the items of the print job analysis data 45 except for the "preview page". The "preview page" indicates a page of the generated preview image.

Figure 4:
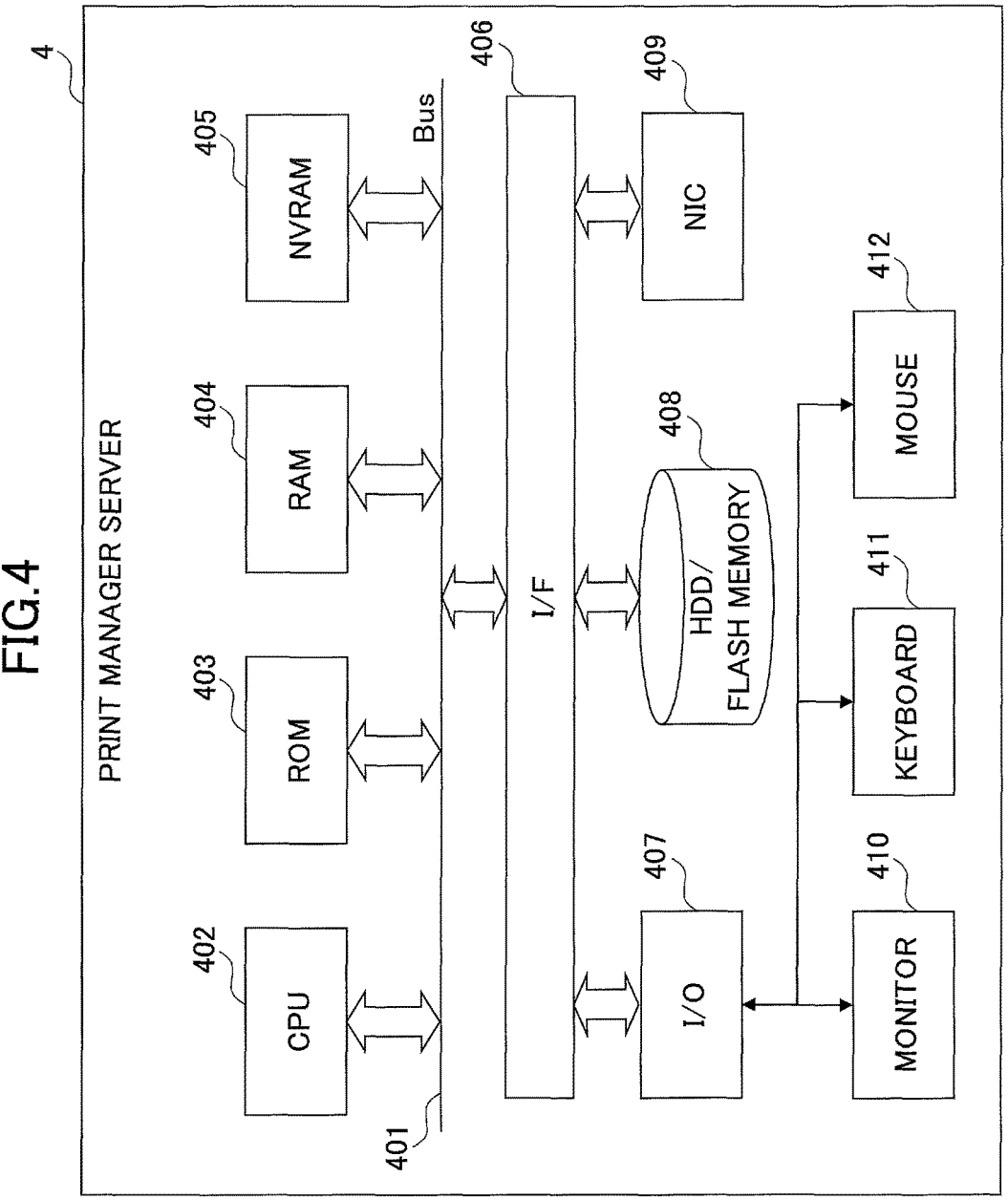
FIG. 4 is a diagram illustrating a hardware configuration example of the print manager server.

FIG. 4 is a diagram illustrating a hardware configuration example of the print manager server 4. As illustrated in FIG. 4, the print manager server 4 includes a central processing unit (CPU) 402, a read only memory (ROM) 403, a random access memory (RAM) 404, and a non-volatile random access memory (NVRAM) 405 that are coupled to a system bus 401. The print manager server 4 further includes an interface (I/F) 406, an input-output (I/O) 407, a hard disk drive (HDD)/flash memory 408, and a network interface card (NIC) 409 that are coupled to the I/F 406, and a monitor 410, a keyboard 411, and a mouse 412 that are coupled to the I/O 407. A compact disk/digital versatile disk (CD/DVD) drive or the like may also be coupled to the I/O 407.

The function of the print manager server 4 illustrated in FIG. 2 may be implemented by causing the CPU 402 to execute a predetermined program. Such a program may be acquired via a recording medium or through the network.

The hardware configuration of the business host 2 or the print manager client 5 is similar to the hardware configuration of the print manager server 4 illustrated in FIG. 4.

Operations

Figure 5:
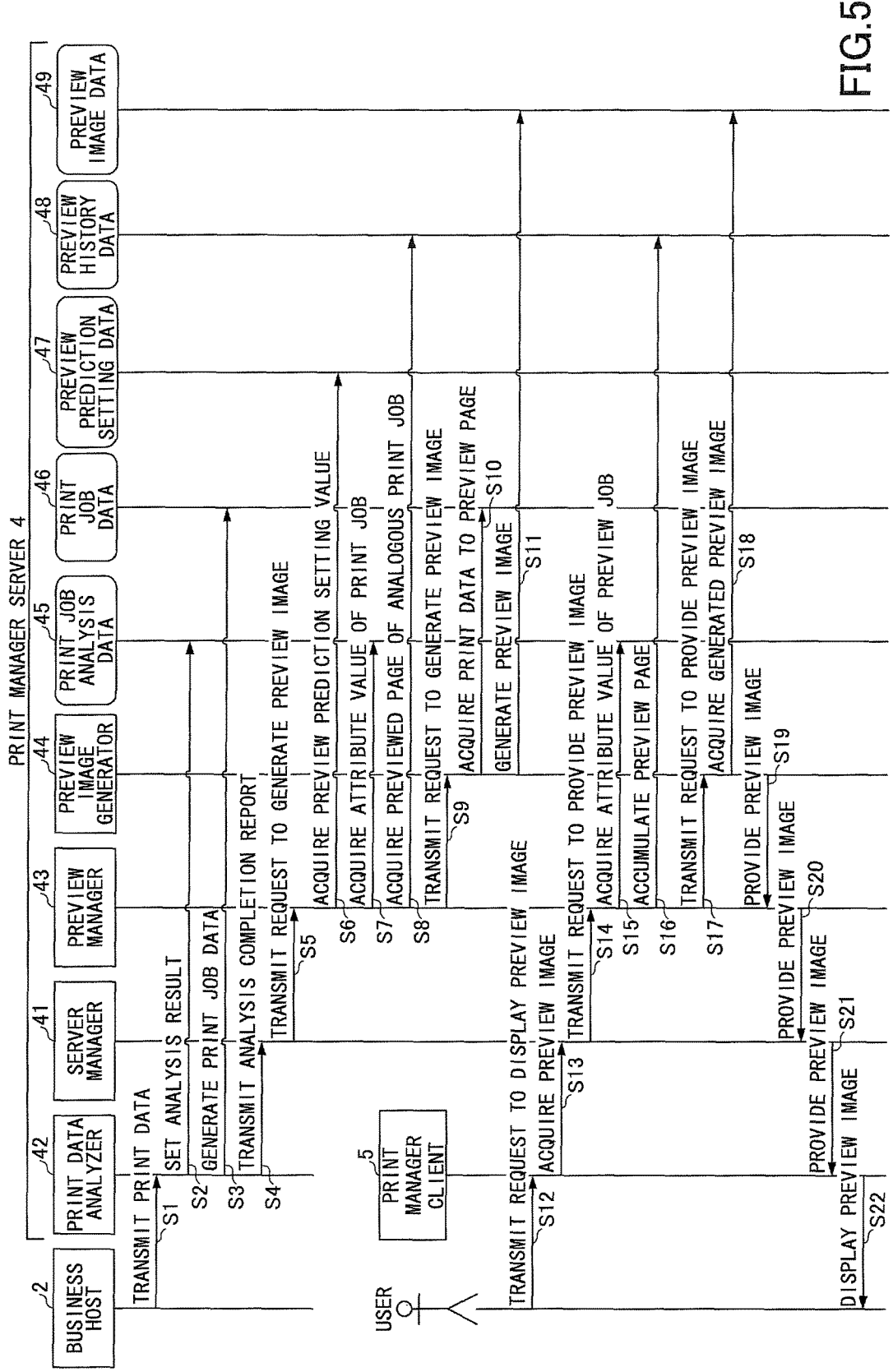
FIG. 5 is a sequence diagram illustrating an example of a process according to an embodiment.

FIG. 5 is a sequence diagram illustrating an example of a process according to the embodiment. The process of FIG. 5 depicts a flow from receiving specific print data to displaying a preview image.

In FIG. 5, the business host 2 generates print data and transmits the generated print data to the print data analyzer 42 of the print manager server 4 via the network 1 (step S1).

The print data analyzer 42 analyzes the received print data and sets the analyzed result in the print job analysis data 45 (step S2). The print data analyzer 42 subsequently generates the print job data 46 from the print data (step S3). The print data analyzer 42 subsequently sends an analysis completion report to the server manager 41 (step S4).

The server manager 41 transmits a request to generate a preview image of the analyzed print job to the preview manager 43 (step S5). The preview manager 43 acquires prediction conditions from the preview prediction setting data 47 in response to the received request (step S6). The preview manager 43 subsequently acquires attribute information necessary for predicting the corresponding job from the print job analysis data 45 based on the acquired prediction conditions (step S7). The preview manager 43 subsequently acquires previewed pages having attributes matching the prediction conditions of the corresponding job from the preview history data 48 and predicts pages to be previewed based on the number of frequently previewed pages (step S8). The preview manager 43 then transmits a request to generate preview images of the predicted pages to the preview image generator 44 (step S9).

The preview image generator 44 acquires the print data of the pages specified to be previewed from the print job data 46 in response to the received request (step S10). The preview image generator 44 then generates the preview image data 49 (step S11).

On the other hand, the user selects a desired job from the graphical user interface (GUI) screen provided by the print manager client and transmits a request to display a preview image of the desired page to the print manager client 5 (step S12).

The print manager client 5 transmits a request to acquire a preview image by specifying a page of a specific print job to the server manager 41 of the print manager server 4 in response to the received request (step S13). The server manager 41 transmits a request to acquire the preview image by specifying the page of the specific print job to the preview manager 43 (step S14).

The preview manager 43 acquires an attribute of the job to be previewed from the print job analysis data 45 in response to the received request (step S15). The preview manager 43 subsequently stores the attribute of the job and the page to be previewed in the preview history data 48 (step S16). The preview image generator 43 then transmits a request to provide a preview image to the preview image generator 44 (step S17).

The preview image generator 44 acquires the already generated (step S11) preview image data 49 in response to the received request (step S18). When there is no preview image of the corresponding page, the preview image generator 44 generates a new preview image of the corresponding page. When the prediction of the preview images is highly accurate, the preview image generator 44 may simply acquire the generated preview images in most cases, thereby reducing the mean processing time.

The preview image generator 44 then provides the acquired or generated preview image to the preview manager 43 (step S19). The preview manager 43 provides the preview image acquired from the preview image generator 44 to the server manager 41 (step S20). The preview manager 43 provides the preview image acquired from the preview manager 43 to the print manager client 5 (step S21). The print manager client 5 displays a print preview screen including the preview image acquired from the server manager 41 to the user (step S22).

In the following, a description is given of the above process more in detail.

Figure 6:
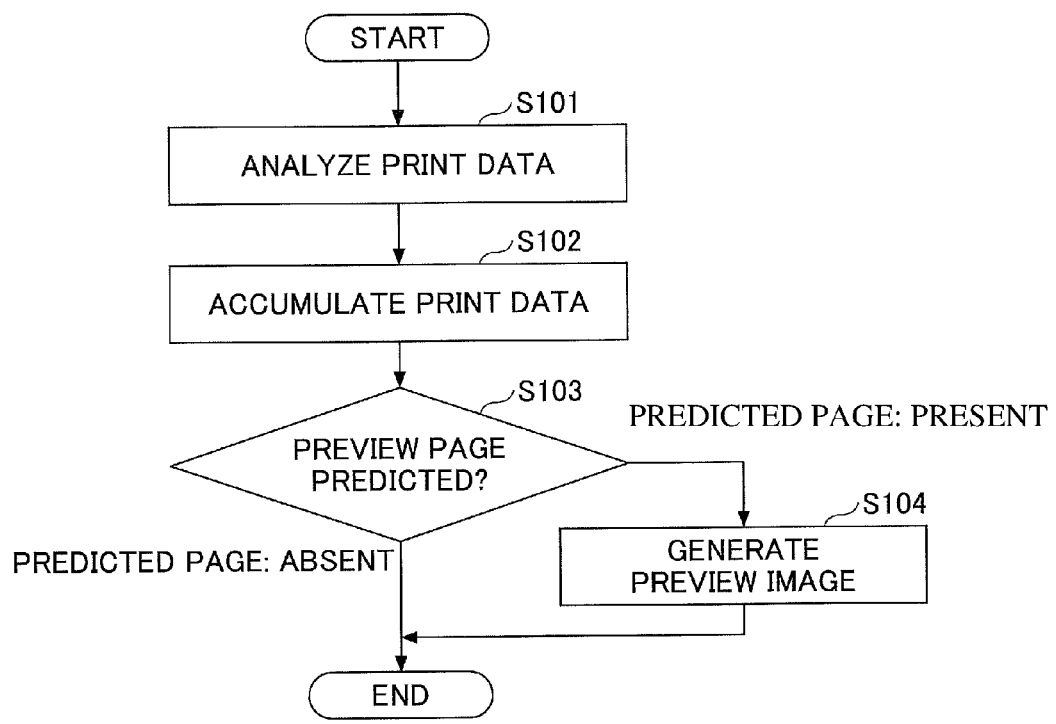
FIG. 6 is a flowchart illustrating an example of a process of generating a preview image at a time of accumulating print data.

FIG. 6 is a flowchart illustrating an example of a process of generating a preview image at the time of accumulating the print data. In FIG. 6, the print data analyzer 42 of the print manager server 4 analyzes the attribute of the print data received from the business host 2 and saves the analyzed result as the print job analysis data 45 (step S101).

The print data analyzer 42 subsequently converts the print data received from the business host 2 into a file format and saves the converted print data as the print job data 46 (step S102).

The preview manager 43 subsequently predicts a page to be previewed in accordance with the preview prediction setting data 47, the print job analysis data 45, and the preview history data 48 that are previously set by the user (step S103).

When the preview manager 43 has predicted a page to be previewed, the preview image generator 44 generates a preview image of the predicted page (step S104). When the preview manager 43 has not predicted a page to be previewed, the preview image generator 44 will not generate a preview image.

Figure 7:
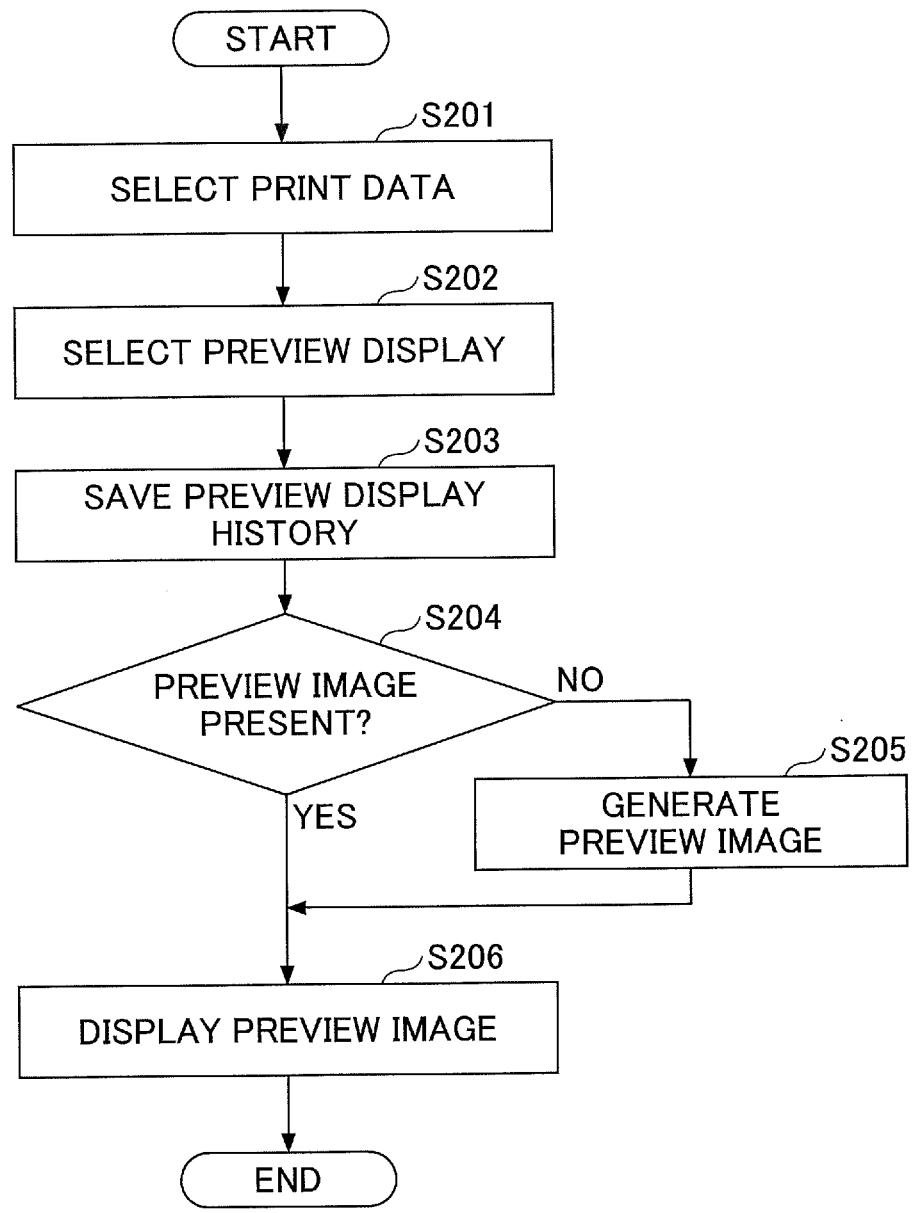
FIG. 7 is a flowchart illustrating an example of a process from receiving a preview instruction to displaying a preview image.

FIG. 7 is a flowchart illustrating an example of a process from receiving the preview instruction from the user to displaying the preview image. In FIG. 7, the user selects the print data to be previewed via the GUI of the print manager client 5 (step S201).

The user subsequently selects a page to be previewed from a preview display menu of the print data selected via the GUI of the print manager client 5 (step S202). When the user has selected the page to be previewed, the print manager client 5 transmits a request to provide the preview image of the specified (selected) page to the server manager 41 of the print manager server 4. The server manager 41 transmits the received request to provide the preview image to the preview manager 43.

The preview manager 43 subsequently accumulates the attributes of the preview requested print data and the requested page in the preview history data 48 (step S203).

The preview manager 43 subsequently checks whether there is a preview image of the page of the print data that matches the preview request (step S204). When there is no preview image of the page that matches the preview request, the preview manager 43 causes the preview image generator 44 to generate a preview image (step S205). The preview manager 43 then transmits the generated preview image to the print manager client 5 via the server manager 41 (step S206). The print manager client 5 receives the transmitted preview image and displays the preview image on the GUI.

When there is a preview image of the page of the print data that matches the preview request, the preview manager 43 transmits the already existing preview image to the print manager client 5 via the server manager 41 without generating a preview image (step S206). The print manager client 5 receives the transmitted preview image and displays the preview image on the GUI.

Figure 8:
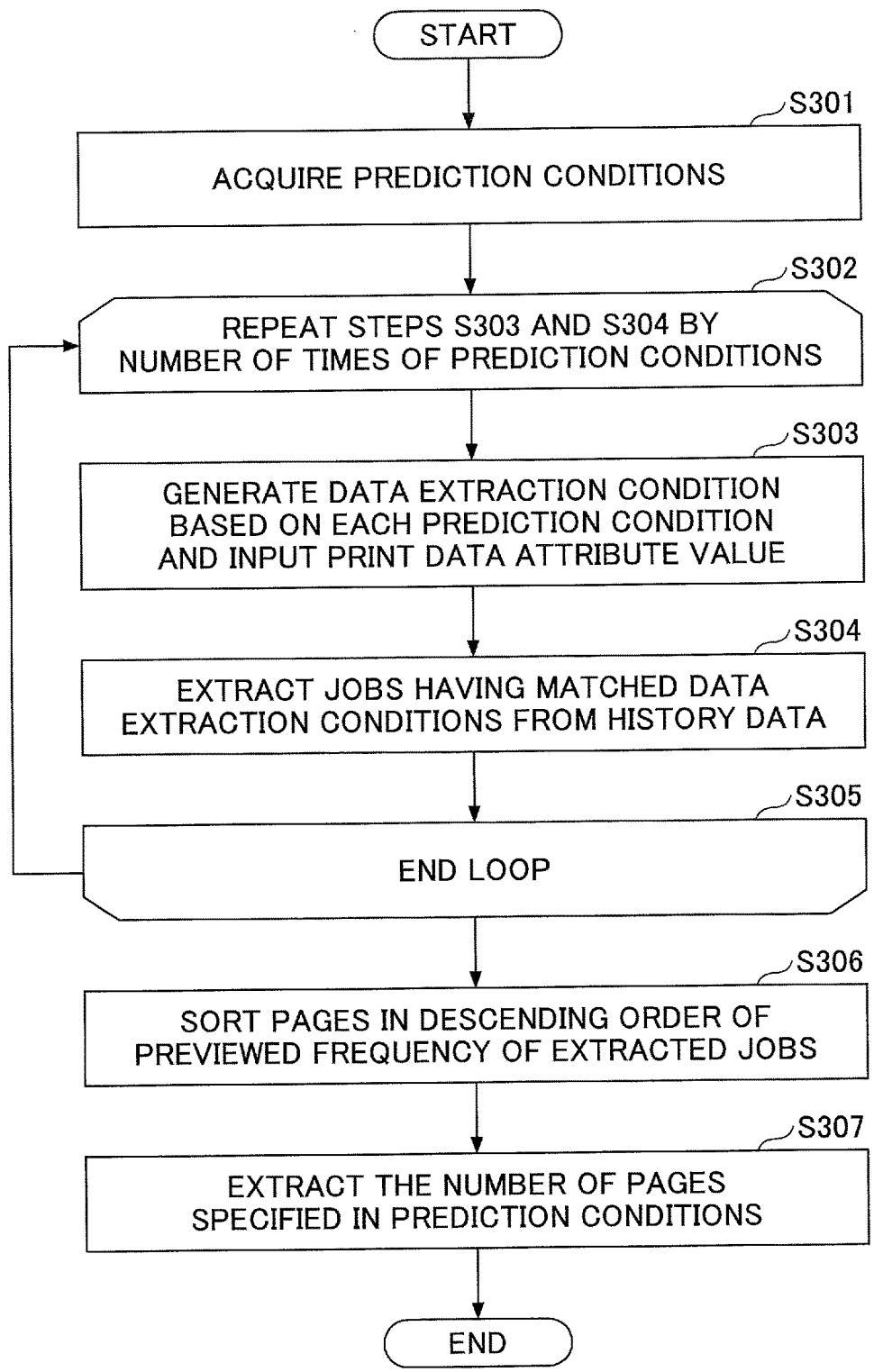
FIG. 8 is a flowchart illustrating an example of a process of predicting a preview page.

FIG. 8 is a flowchart illustrating an example of a process of predicting a preview page. In FIG. 8, the preview manager 43 acquires prediction conditions from the preview prediction setting data 47 (step S301).

The preview manager 43 subsequently repeats the following processes by the number of times corresponding to the prediction conditions (steps S302 to S305). More specifically, the preview manager 43 acquires an attribute value corresponding to the attribute specified as a key of each prediction condition from the print job analysis data 45 and generates a data extraction condition based on the prediction condition and the attribute value (step S303).

The preview manager 43 subsequently extracts jobs that satisfy the data extraction conditions (e.g., complete matching, partial matching, and a range) from the preview history data 48 or the data extracted in step S303 (step S304). Steps S303 to S305 are repeated in a loop.

When the extraction is completed for all the set conditions to end the loop (step S305), the preview manager 43 sorts the pages in the descending order of the previewed frequency of the extracted jobs (step S306).

The preview manager 43 extracts the number of pages specified in the prediction conditions in the sorted order of the pages (step S307).

Figure 9:
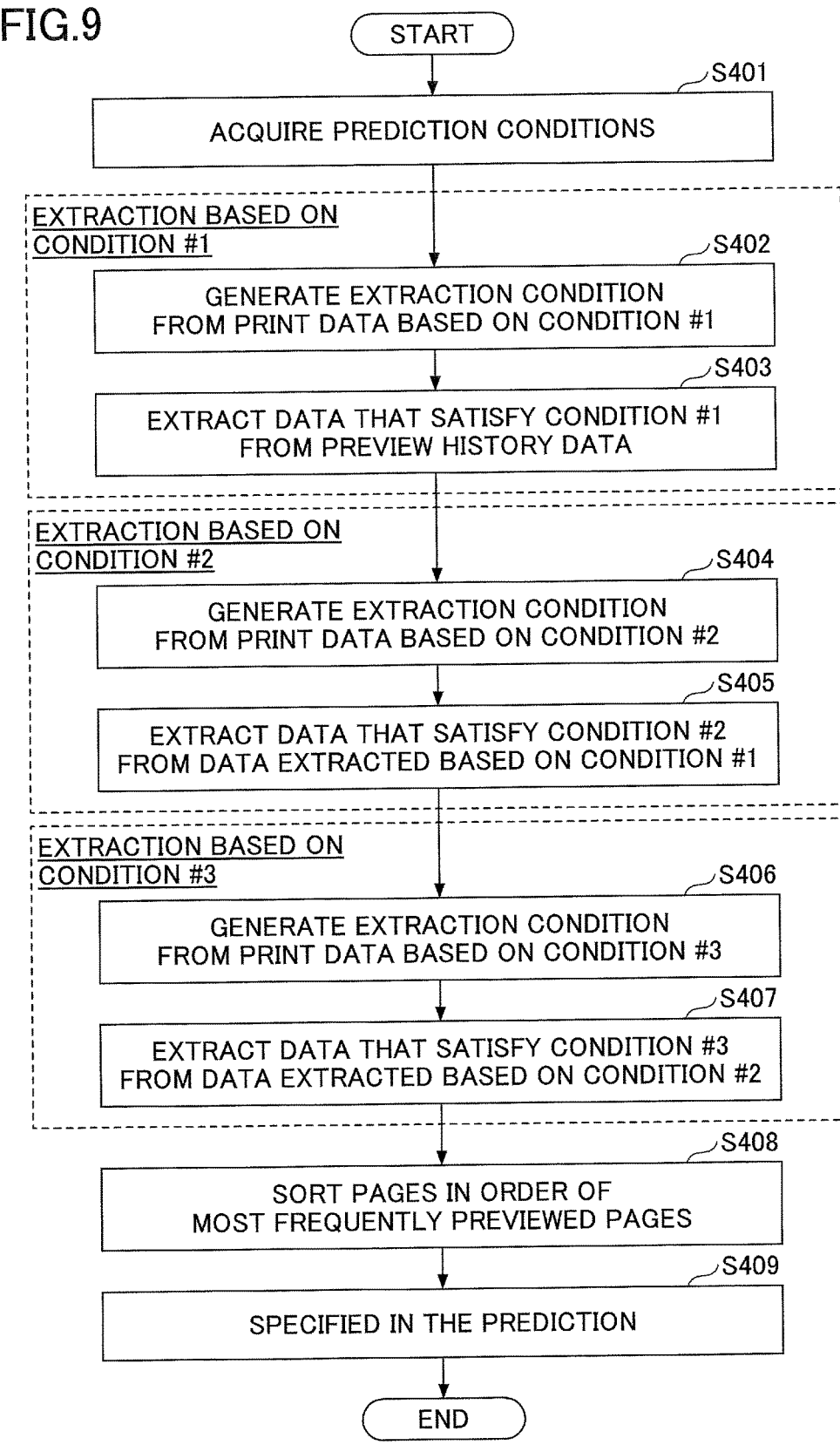
FIG. 9 is a flowchart illustrating an example of a specific process of predicting a preview.

FIG. 9 is a flowchart illustrating an example of a specific process of predicting a preview. In FIG. 9, the preview manager 43 acquires preview prediction conditions from the preview prediction setting data 47 (step S401).

FIG. 10A illustrates examples of preview prediction conditions to be acquired. The preview prediction conditions include three conditions #1 to #3 and settings processes to be performed in accordance with obtained results of the conditions #1 to #3.

Referring back to FIG. 9, the preview manager 43 extracts an attribute (=job name) specified by the condition #1 of the preview prediction conditions from the print data and generates an extraction condition of the condition #1 (step S402). More specifically, when the condition #1 of the preview prediction conditions is "the first three characters of the job name are matched" as illustrated in FIG. 10A and the job name of the print job analysis data is "AAA010" as illustrated in FIG. 10B, the extraction condition is "the first three characters of the job name are AAA" as illustrated in FIG. 10C.

Referring back to FIG. 9, the preview manager 43 extracts data that satisfy the extraction condition "the first three characters of the job name are AAA" from the preview history data 48 (step S403). FIG. 11A illustrates an example of the preview history data 48 and FIG. 11B illustrates preview history data are extracted from the preview history data 48 of FIG. 11A. The preview history data illustrated in FIG. 11B satisfy the condition #1 "the first three characters of the job name are AAA".

Referring back to FIG. 9, the preview manager 43 extracts an attribute (=computer name) specified by the condition #2 of the preview prediction conditions from the print data and generates an extraction condition of the condition #2 (step S404). More specifically, when the condition #2 of the preview prediction conditions is "the computer name is completely matched" as illustrated in FIG. 10A and the computer name of the print job analysis data is "PC001" as illustrated in FIG. 10B, the extraction condition is "the computer name is PC001" as illustrated in FIG. 12A.

Referring back to FIG. 9, the preview manager 43 extracts data that satisfy the extraction condition "the computer name is PC001" from the preview history data extracted based on the condition #1 (step S405). FIG. 12B illustrates preview history data extracted from the preview history data of FIG. 11B. The extracted preview history data satisfy the condition #2 "the computer name is PC001".

Referring back to FIG. 9, the preview manager 43 extracts an attribute (=the number of pages) specified by the condition #3 of the preview prediction conditions from the print data and generates an extraction condition of the condition #3 (step S406). More specifically, when the condition #3 of the preview prediction conditions is "the number of pages is within a range of 5%" as illustrated in FIG. 10A and the number of pages of the print job analysis data is "100 pages" as illustrated in FIG. 10B, the extraction condition is "the number of pages is between 95 to 105" as illustrated in FIG. 13A.

Referring back to FIG. 9, the preview manager 43 extracts data that satisfy the extraction condition "the number of pages is between 95 to 105" from the preview history data extracted based on the condition #2 (step S407). FIG. 13B illustrates preview history data extracted from the preview history data of FIG. 12B. The extracted preview history data satisfy the condition #3 "the number of pages is between 95 to 105".

Referring back to FIG. 9, the preview manager 43 sorts the pages in the order of most frequently previewed pages from the preview history data extracted based on the condition #3 (step S408). FIG. 14A illustrates a result of sorted pages.

Referring back to FIG. 9, the preview manager 43 extracts top three pages of the sorted result in accordance with the instruction "extract top three pages that satisfy the conditions" specified in the preview prediction conditions to be presented as preview prediction pages (step S409). FIG. 14B illustrates pages extracted as the preview prediction pages, indicating "$1^{st}$ page", "$50^{th}$ page", and "$100^{th}$ page" as the top three pages.

Overview

In accordance with the disclosed technology, the pages to be previewed may be predicted based on the attributes of the subject print data, the preview history, and the preview conditions and the preview images of the predicted pages generated in advance. Accordingly, it may be possible to reduce the time from receiving a request to display the preview of the desired pages to displaying the preview images. In addition, the accuracy in predicting the preview pages may be improved along with longer operations of the print manager server of the print management system of the embodiment by accumulating a large number of the previously previewed records as the preview history.

The preferred embodiments are described above. The above-described embodiments illustrate specific examples of the invention; however, the present invention is not limited to these examples, and various alterations or changes may be made without departing from the gist and the scope of the claims of the present invention. Specifically, the present invention shall not be construed as being limited to details of the specific examples and accompanying drawings thereof.

Correspondence Between Terms in the Embodiments and Terms in the Claims

The print data analyzer 42 in the embodiments is an example of an "analyzer" in the claims. The preview manager 43 in the embodiments is an example of a "predictor" in the claims. The preview image generator 44 in the embodiments is an example of a "generator" in the claims. The server manager 41 and the preview manager 43 are examples of a "provider" in the claims.

In accordance with the disclosed technology, it may be possible to reduce time from receiving the preview request to displaying preview images.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.)

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The present invention is not limited to the specifically disclosed embodiments, and variations and modifications may be made without departing from the scope of the present invention.

What is claimed is:

1. A print manager server comprising:
   one or more processors; and
   a memory configured to store a print management program, wherein the processors execute the print management program to perform a process including:
   analyzing an attribute of print data introduced;
   predicting a page of a preview image to be generated based on the analyzed attribute, a history of a corresponding page in previous print jobs having been previewed, and a preview prediction condition;
   generating the preview image of the predicted page; and
   providing the generated preview image in response to a request to display a preview.

2. The print manager server according to claim 1, wherein the preview prediction condition is maintained in a form editable by a user.

3. The print manager server according to claim 1, wherein the preview prediction condition includes one of conditions in association with a job name, a computer name, and the number of pages.

4. A print management method executed by a computer having one or more processors, the print management method comprising:
   analyzing, by the processors, an attribute of print data introduced;
   predicting, by the processors, a page of a preview image to be generated based on the analyzed attribute, a history of a corresponding page in previous print jobs having been previewed, and a preview prediction condition;
   generating, by the processors, the preview image of the predicted page; and
   providing, by the processors, the generated preview image in response to a request to display a preview.

5. The print management method according to claim 4, wherein the preview prediction condition is maintained in a form editable by a user.

6. The print management method according to claim 4, wherein the preview prediction condition includes one of conditions in association with a job name, a computer name, and the number of pages.

7. A non-transitory computer-readable storage medium storing therein a print management program that causes a computer having one or more processors to execute a process, the process comprising:
   analyzing, by the processors, an attribute of print data introduced;
   predicting, by the processors, a page of a preview image to be generated based on the analyzed attribute, a history of a corresponding page in previous print jobs having been previewed, and a preview prediction condition;
   generating, by the processors, the preview image of the predicted page; and
   providing, by the processors, the already generated preview image in response to a request to display a preview.

8. The non-transitory computer-readable storage medium according to claim 7, wherein the preview prediction condition is maintained in a form editable by a user.

9. The non-transitory computer-readable storage medium according to claim 7, wherein the preview prediction condition includes one of conditions in association with a job name, a computer name, and the number of pages.

* * * * *